Figure 1:
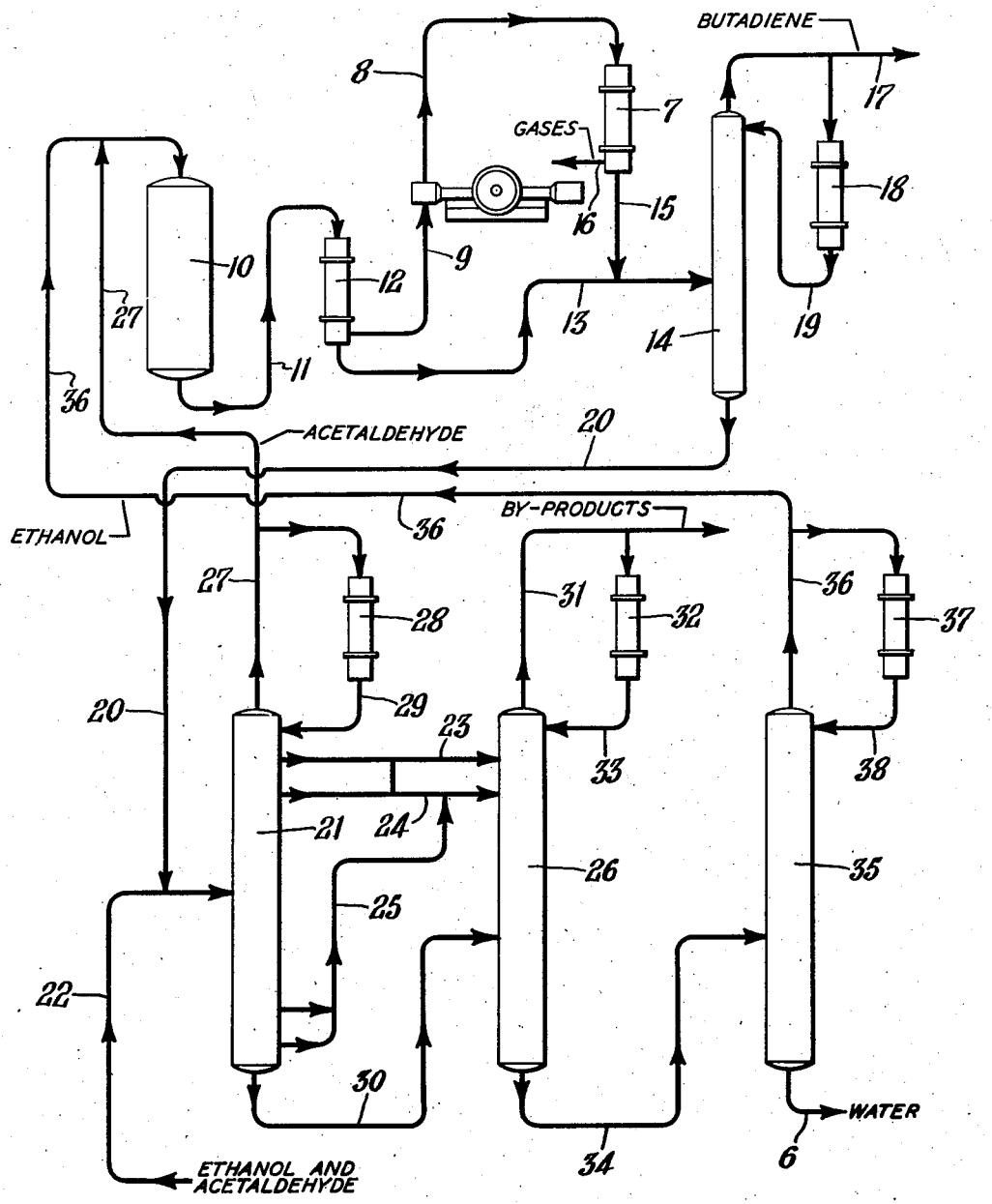

July 9, 1946.  M. E. HITCHCOCK ET AL  2,403,743
CYCLIC BUTADIENE PROCESS
Filed March 16, 1944   2 Sheets-Sheet 1

INVENTORS
MELVILLE E. HITCHCOCK
JOHN A. FIELD
BY
ATTORNEY

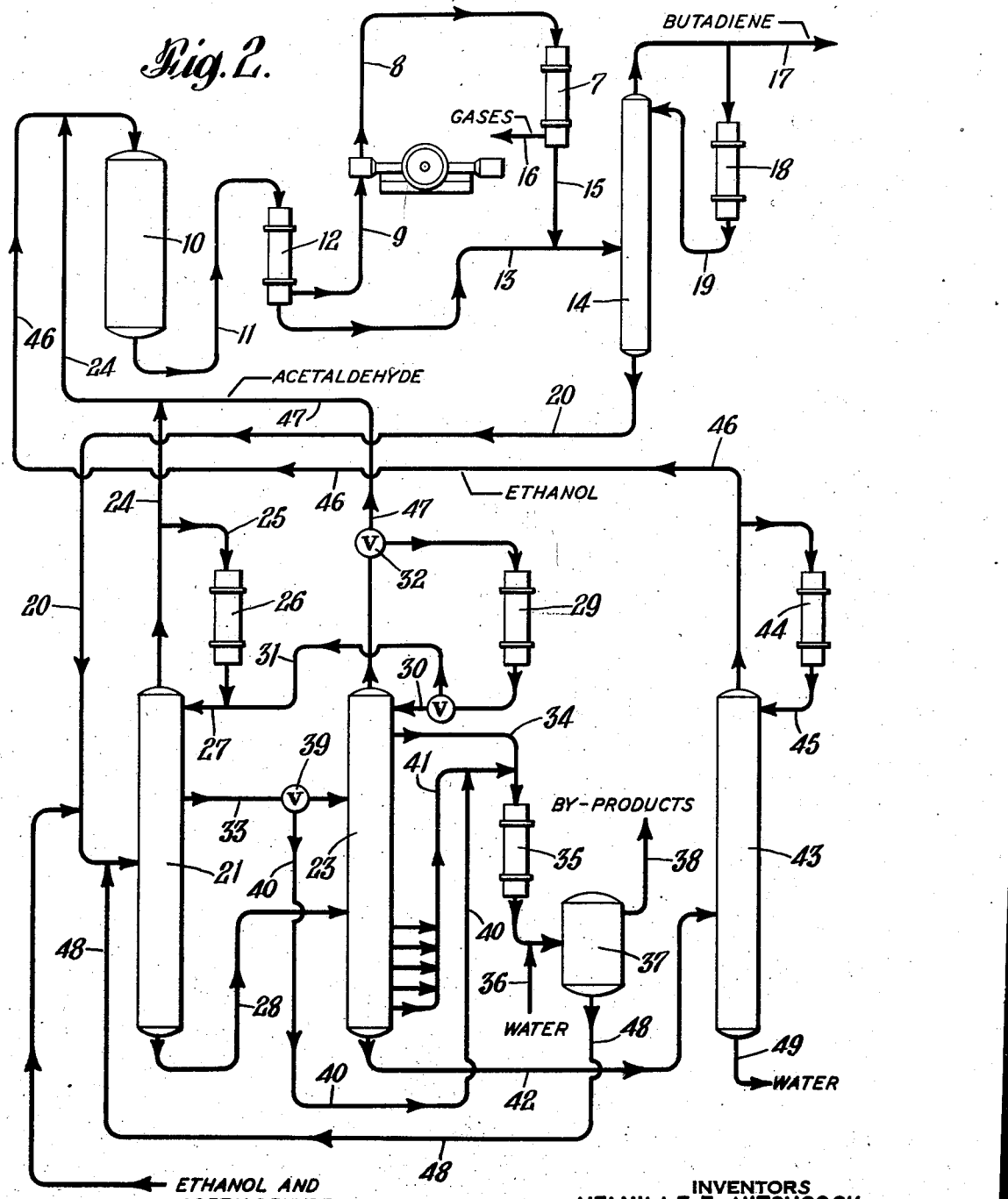

Patented July 9, 1946

UNITED STATES PATENT OFFICE 2,403,743

CYCLIC BUTADIENE PROCESS

Melville E. Hitchcock, South Charleston, and John A. Field, Charleston, W. Va., assignors to Carbide and Carbon Chemicals Corporation, a corporation of New York Application March 16, 1944, Serial No. 526,792

7 Claims. (Cl. 260—681)

This invention relates to a cyclic process for producing butadiene from a mixture of ethanol and acetaldehyde, and to a means for recovering and recycling acetaldehyde in such a process.

The reaction of acetaldehyde and ethanol in the presence of suitable catalysts to produce butadiene has been the subject of academic investigation for many years, and the development of improved catalysts has permitted the process to be operated commercially. In the present state of the art, however, no catalyst of sufficient selectivity is known which does not also exert a secondary action on the ethanol and acetaldehyde to convert them to side reaction products. The principal side reaction which occurs is the dehydration of ethanol to diethyl ether, although esters, ketones, liquid hydrocarbons and higher aldehydes are also produced as the result of more complex side reactions.

The products from the butadiene converter contain butadiene, ethanol, acetaldehyde, hydrocarbon gases and the side reaction products discussed above (hereinafter termed "by-products"). Butadiene may be separated readily from the other reaction products by a combination of condensation, scrubbing and distillation processes, but the recovery of acetaldehyde for recycling and the removal of by-products has proven difficult. Even with efficient distillation columns, such by-products tend to accumulate in the acetaldehyde distillate in an increasing degree until it is necessary to discard a large amount of material from the cycle to reduce the concentration of by-products. Also, when the by-products are recycled in large amounts, they cause a reduction in the production of butadiene through dilution of the reactants. Furthermore, when recycled in large quantities, the by-products may react with ethanol or acetaldehyde, which reduces the chemical efficiency of the process. Finally, in these quantities, some of the by-products exert a harmful action on the catalyst, reducing its effectiveness by depositing excessive carbonaceous material thereon, thus necessitating more frequent reactivations of the catalyst and reducing its availability for butadiene production and its ultimate life.

The complexity of this problem is increased by the fact that acetaldehyde forms an azeotropic mixture with diethyl ether, boiling at about 57° C. under a pressure of 40 p. s. i. gauge. At these temperatures and pressures, the azeotrope contains about 75% acetaldehyde by weight. However, this azeotrope cannot be continuously generated in a column for recovering acetaldehyde from the reaction products of the butadiene converter when the base temperature is sufficiently high, about 120° C., to volatilize all the acetaldehyde from the base of the column. Under such conditions, the by-products, including additional diethyl ether, tend to distill over with the acetaldehyde-diethyl ether azeotrope in such quantities that the concentration of acetaldehyde in the distillate from the column has been reduced at times to as low as 50%.

By means of this invention, the concentration of by-products throughout the column removing acetaldehyde is regulated so that a distillate containing at least about 75% acetaldehyde may be removed from the column. This regulation is achieved by withdrawing small amounts of the contents of the column from one or more plates in the column where a high concentration of such by-products exists. The side streams may be withdrawn either in the liquid or vapor phase and they may be treated by various methods to recover the ethanol and acetaldehyde contained in them, as by distillation or by extraction with water.

One means of practicing the invention will be described with reference to the drawings of Figure 1. Ethanol and acetaldehyde vapors, for example in the molar ratio of about 3 to 1 respectively, are passed to a converter 10, which contains a catalyst of an appropriate type at a temperature of about 300° to 350° C. Suitable catalysts are described in United States application Serial No. 460,120, filed September 29, 1942, by W. J. Toussaint and J. T. Dunn. Part of the ethanol and acetaldehyde is converted to butadiene in the presence of the catalyst, and the effluent vapors pass through pipe 11 to a condenser 12, where the less volatile constituents are liquefied, and withdrawn through pipe 13 to distillation column 14, to recover the condensed butadiene. The gases leaving the condenser through pipe 9 are compressed to a pressure of about 55 p. s. i. gauge and pass through pipe 8 to condenser 7, where additional amounts of the components including butadiene are liquefied. The liquefied components pass through pipe 15 to distillation column 14. The uncondensed gases are withdrawn through pipe 16, and butadiene and acetaldehyde may be recovered from such gases by scrubbing them with a solvent, such as ethanol.

From the distillation column 14, butadiene vapor of about 90% purity is removed through pipe 17 for further purification. Part of the butadiene is condensed in condenser 18, and returned through pipe 19, as reflux for the column. The residue from the column contains acetaldehyde, ethanol, water, diethyl ether and other by-products, and is fed through line 20 to distillation column 21. It is the operation of this column to which the invention is particularly directed. In this particular embodiment of the invention, this column is also designed to separate acetaldehyde from ethanol and impurities, which are formed when ethanol is dehydrogenated to acetaldehyde according to well-known methods. Such a mixture may be introduced through pipe 22. However, the major by-products are those formed in the reaction of ethanol and acetaldehyde to form butadiene, and the principles of the invention are applicable irrespective of the source of the acetaldehyde feed mixture. With respect to the particular embodiment of the invention involved, a typical feed to column 21 may contain approximately 15% acetaldehyde, 40% ethanol, 31% water, 6% diethyl ether and 8% of other by-products.

Column 21 may consist of a fractionating column having 54 plates. It is desired to maintain a head temperature of 57° C. at a pressure of 40 p. s. i., and a reflux ratio of about 3 to 1 will maintain such a head temperature. The column is heated by steam, preferably by circulating the contents of the kettle through a calandria.

To regulate the concentration of diethyl ether and other by-products throughout the column, so that a distillate principally comprising acetaldehyde, which may contain about 75% acetaldehyde at the specified temperatures and pressures, may be distilled from the column, about 2 to 5% by weight of the total downflow in the column may be removed at a point above the feed point, suitably from about the thirty-fourth or fortieth plate. The withdrawal may be from the liquid or vapor phase. The composition of this side stream may be about 40% acetaldehyde, 15% by-products and 45% diethyl ether. A side stream of higher boiling by-products may also be withdrawn at about the same rate from a point below the feed point, suitably from about the fourth or tenth plate. The composition of the lower side stream may be approximately 20% ethyl acetate, 15% other by-products, 45% ethanol, and 20% water. The withdrawal of both side streams serves to stabilize operation of the column, although the withdrawal of the lower side stream is not essential for this purpose.

After the side streams have been withdrawn, it is desirable to treat them to recover their valuable components. One method of accomplishing this is to feed them through pipes 23, 24 and 25 to the upper part of column 26, intended for the continuous removal of by-products.

Part of the overhead vapor from column 21, containing about 75% acetaldehyde, is withdrawn through pipe 27 and passes to the butadiene converter. The remainder of the overhead vapor is condensed in condenser 28 and returned as reflux to the column through pipe 29. The residue from column 21 passes through pipe 30 to fractionating column 26. This column may operate at a head temperature of 70°-75° C. at 20 p. s. i. and a reflux ratio of 2 to 1. By-products are removed continuously from this column through pipe 31, and they may be treated by distillation or extraction with water to recover valuable materials. Part of the by-products fraction is condensed in condenser 32 and returned as reflux through pipe 33.

The residue from the by-products column passes through pipe 34 to column 35, where a mixture of ethanol and water is removed as vapor, and at least part of such vapor is returned to the butadiene converter 10 through pipe 36. This column may operate at a head temperature of 118° C. under a pressure of 50 p. s. i. gauge. Part of the ethanol is condensed in condenser 37 and returned as reflux through pipe 38. Water is discharged through pipe 6. Ethanol consumed in the process may be supplied at any convenient point in the cycle, for instance, as part of the reflux in the ethanol column. Where the butadiene reaction is operated in conjunction with the dehydrogenation of ethanol to produce acetaldehyde, part of the recovered ethanol may be recycled to produce additional acetaldehyde. Where acetaldehyde is produced in an independent cycle, as would be the case were it manufactured from acetylene, or where the acetaldehyde is purchased, the acetaldehyde required in the process may be added as part of the reflux required in the acetaldehyde column.

Instead of feeding the side streams to column 26, they may be washed with water, either batch-wise or by continuous extraction, to recover the acetaldehyde, and the aqueous component returned to column 21 to separate the acetaldehyde. Likewise, such side streams may be combined with the by-product distillate from column 26, washed with water to recover the water-soluble ingredients, and the aqueous phase returned to column 21.

In another modification of the invention, illustrated in Figure 2, acetaldehyde vapor of satisfactory purity is produced in a distillation column by a combination of side stream withdrawal from that column, accompanied by washing of the side streams withdrawn to recover acetaldehyde and ethanol, and recycling of the wash liquor to remove the recovered acetaldehyde and ethanol. In this modification, a by-product fraction is not removed continuously as an overhead fraction, but is separated by decantation in the washing step. According to this modification, the butadiene is produced and separated as before, and the residue from the butadiene still 14 is fed through pipe 20 to column 21, together with a mixture of ethanol and acetaldehyde, which may be produced by the dehydrogenation of ethanol. Column 21 is operated at a head temperature of 57° C. at a pressure of 40 p. s. i. gauge, and a reflux ratio of 3 to 1 is maintained on the column. The azeotrope of acetaldehyde-diethyl ether is readily generated in the column for two reasons. One is that a side stream of concentrated by-products is withdrawn from the upper part of the column as before. The other is that the operation of the subsequent column 23 has been modified so that acetaldehyde as well as volatile by-products may, in this instance, be permitted to pass from the base of the column 21. The aldehyde vapors from column 21 pass through pipe 24 to the butadiene converter, part being withdrawn through pipe 25, condensed in condenser 26 and returned through pipe 27 to serve as reflux for the column.

The residue from column 21 is withdrawn through pipe 28 and passes to column 23. This residue may contain acetaldehyde, diethyl ether and other by-products of substantial volatility, which components are removed as overhead vapor or side streams in column 23. This column is operated under such conditions that overhead vapor of at least an azeotropic concentration of acetaldehyde is generated. This vapor may be totally condensed in condenser 29, and part of the condensate returned as reflux to column 23 through pipe 30, and part transferred to column 21 through pipe 31 as reflux for that column. Alternatively, however, by means of valve 32 only part of the acetaldehyde vapor from the second column 23 may be condensed, and the uncondensed part combined through pipe 47 with the uncondensed vapors from column 21 flowing to the butadiene converter through pipe 24.

The side stream withdrawn from column 21 may be passed directly to column 23 through pipe 33 or it may be subjected to a washing treatment. The side stream may be withdrawn as a liquid or as a vapor. When withdrawn in the vapor phase, the side stream is, of course, condensed before washing.

Suitable operating conditions for generating vapors from column 23 containing at least an azeotropic concentration of acetaldehyde include maintaining a head temperature of 48° C. under a pressure of 20 p. s. i. gauge, and a reflux ratio of 3:1 to 8:1. Operating under these conditions, the by-products may be concentrated at a point about one-fifth of the distance from the top of the column. Such by-products may be withdrawn at a rate of about 5 to 7% by weight of the total downflow in the column at this point. The by-products are withdrawn through pipe 34, condensed in condenser 35, and mixed with from 2 to 3 times their volume of water introduced through pipe 36. The mixed liquids pass to a decanter 37, where they separate into two layers. The top layer of water-insoluble by-products is withdrawn through pipe 38, and the lower aqueous layer, containing acetaldehyde, as well as ethanol, is returned to column 21 through pipe 48 to recover the acetaldehyde. The percentage recovery of acetaldehyde from the by-product stream withdrawn through pipe 34, is dependent on the ratio of water to by-products employed in the washing step. The by-product layer may be washed again with water in a counter-current extraction system or distilled to effect substantially complete recovery of acetaldehyde and ethanol.

The by-product stream from column 21 may alternatively be withdrawn through valve 39 and pipe 40, and subjected to the washing operation. If desired, higher boiling by-products, in admixture principally with ethanol, may be withdrawn from suitable taps in the lower part of the column 23 and introduced through pipe 41 to the washing operation. The amount of the total side streams withdrawn from the lower section of the column may be about 5 to 10% of the downflow in the column. Such side streams may, of course, be washed separately. If these side streams are washed separately, the aqueous layer may be passed directly to a column for recovering ethanol.

The residue from column 23 is passed through a pipe 42 to a column 43 for the recovery of ethanol. This column is operated in the same manner as described previously, and it is equipped with a condenser 44, a reflux return pipe 45, and a pipe 46 for conducting the ethanol vapors to the butadiene converter 10. Water is removed through pipe 49. When the butadiene reaction is not operated in conjunction with a process for producing acetaldehyde from ethanol, additional ethanol and acetaldehyde may be added at any convenient point in the cycle as before. Where the reaction producing acetaldehyde from ethanol is integrated with the reaction producing butadiene from acetaldehyde and ethanol, the ethanol required in the process may be added at any convenient place and part of the recovered ethanol may also be recycled to produce additional acetaldehyde.

In its broadest aspect, the invention is to be regarded as a means for recovering unreacted acetaldehyde of satisfactory purity in a cyclic process for producing butadiene from a mixture of acetaldehyde and ethanol. The acetaldehyde is recovered as the principal product in admixture with diethyl ether and other by-products in a continuous distillation column in which the concentration of diethyl ether and other by-products throughout the column is regulated so as to permit the continuous development of this mixture as an overhead vapor from the column. The methods of regulation include the accumulation of diethyl ether and other by-products at a point below the head of the column, and the removal of such diethyl ether and by-products for subsequent processing according to the methods herein described. It is believed that this method of recovering unreacted acetaldehyde has resulted in an increased production of butadiene at higher chemical efficiencies, and in decreased contamination of the catalyst.

Modifications of the invention will be apparent to those skilled in the art, and are included within the scope of the appended claims.

We claim:

1. In a cyclic process for producing butadiene which comprises passing acetaldehyde and ethanol over a catalyst to form a mixture including butadiene, unreacted acetaldehyde and by-products containing diethyl ether, the steps of removing butadiene from said mixture, and continuously distilling the mixture after expulsion of butadiene to separate a distillate comprising acetaldehyde and diethyl ether, containing at least about 75% acetaldehyde by weight, by withdrawing a fraction less volatile than said distillate at a section above the feed point, and leaving a residue; recycling said acetaldehyde distillate over the catalyst; distilling such residue to remove by-products in the presence of such withdrawn fraction and removing a by-products distillate containing at least part of such fraction.

2. In a cyclic process for producing butadiene which comprises passing acetaldehyde and ethanol over a catalyst to form a mixture including butadiene, unreacted acetaldehyde and by-products containing diethyl ether, the steps of removing butadiene from said mixture, and continuously distilling the mixture after expulsion of butadiene to separate a distillate comprising acetaldehyde and diethyl ether, containing at least about 75% acetaldehyde by weight, by withdrawing a fraction less volatile than said distillate at a section above the feed point, and recycling said acetaldehyde distillate over the catalyst; extracting the water-soluble components of said fraction with water, and returning the aqueous extract to the continuous distillation.

3. In a cyclic process for producing butadiene which comprises passing acetaldehyde and ethanol over a catalyst to form a mixture including butadiene, unreacted acetaldehyde and by-products containing diethyl ether, the steps of removing butadiene from said mixture, and continuously distilling the mixture after expulsion of butadiene to separate a distillate comprising acetaldehyde and diethyl ether, containing at least about 75% acetaldehyde by weight, by withdrawing a fraction less volatile than said distillate at a section above the feed point, and recycling said acetaldehyde distillate over the catalyst; distilling the residue from said distillation to remove a by-products distillate, extracting the water-soluble components of said by-products distillate and said fraction with water, and returning the aqueous extract to said first distillation.

4. In a cyclic process for producing butadiene which comprises passing acetaldehyde and ethanol over a catalyst to form a mixture including butadiene, unreacted acetaldehyde and by-products containing diethyl ether, the steps of removing butadiene from said mixture and continuously distilling the mixture, after expulsion of butadiene, to separate a distillate comprising acetaldehyde and diethyl ether, containing at least about 75% acetaldehyde by weight, by withdrawing a fraction less volatile than said distillate at a section above the feed point, and recycling said acetaldehyde distillate over the catalyst; causing acetaldehyde to be present in the residue from said distillation and distilling such residue in the presence of such fraction to separate a second acetaldehyde distillate by withdrawing an intermediate by-products fraction containing acetaldehyde, washing said by-products fraction with water to form an aqueous component and a non-aqueous component, returning said aqueous component as feed to said first distillation, and condensing said second acetaldehyde distillate and returning it as reflux to said first distillation.

5. In a cyclic process for producing butadiene in which acetaldehyde and ethanol are passed over a catalyst to form a mixture including butadiene, unreacted acetaldehyde, diethyl ether and other by-products, the butadiene removed from said mixture, the mixture continuously distilled after expulsion of butadiene to separate a distillate containing acetaldehyde, diethyl ether and leaving a residue, and the distillate recycled over the catalyst, the step which comprises separating from the distillation zone at a point above which said mixture is supplied to said zone, a side-stream containing more diethyl ether than acetaldehyde to maintain in the distillate a substantial preponderance of the acetaldehyde over the diethyl ether.

6. In a cyclic process for producing butadiene in which acetaldehyde and ethanol are passed over a catalyst to form a mixture including butadiene, unreacted acetaldehyde, diethyl ether and other by-products, the butadiene removed from said mixture, the mixture continuously distilled after expulsion of butadiene to separate a distillate containing acetaldehyde, diethyl ether and other by-products and leaving a residue containing acetaldehyde, and the distillate recycled over the catalyst, the steps which comprise separating from the distillation zone at a point above which said residue is removed from said zone a side-stream less volatile than said distillate to maintain at least 75 per cent of acetaldehyde, by weight, in the distillate; distilling said residue to separate a second distillate containing acetaldehyde and also separating a by-product side-stream from the second distillation zone; washing said by-product side-stream with water to form an aqueous component and a non-aqueous component; and returning said aqueous component as feed to said first zone.

7. In a cyclic process for producing butadiene in which acetaldehyde and ethanol are passed over a catalyst to form a mixture including butadiene, unreacted acetaldehyde, diethyl ether and other by-products, the butadiene removed from said mixture, the mixture continuously distilled after expulsion of butadiene to separate a distillate containing acetaldehyde, diethyl ether and leaving a residue containing acetaldehyde, and the distillate recycled over the catalyst, the steps which comprise separating from the distillation zone at a point above which said residue is removed from said zone a side-stream less volatile than said distillate to maintain at least 75 per cent of acetaldehyde, by weight, in the distillate; distilling said residue to separate a second distillate containing acetaldehyde and also separating a by-product side-stream from the second distillation zone; washing said by-product side-stream and said side-stream first separated with water to form an aqueous component and a non-aqueous component; and returning said aqueous component as feed to said first zone.

MELVILLE E. HITCHCOCK.
JOHN A. FIELD.